(12) United States Patent
Ebergen et al.

(10) Patent No.: US 8,930,582 B2
(45) Date of Patent: Jan. 6, 2015

(54) METHOD AND APPARATUS FOR REGULATING COMMUNICATIONS BETWEEN MULTIPLE TRANSMITTERS AND RECEIVERS

(75) Inventors: Josephus C. Ebergen, San Francisco, CA (US); Danny Cohen, Pacific Palisades, CA (US)

(73) Assignee: Oracle America, Inc., Redwood Shores, CA (US)

( * ) Notice: Subject to any disclaimer, the term of this patent is extended or adjusted under 35 U.S.C. 154(b) by 2559 days.

(21) Appl. No.: 10/699,412

(22) Filed: Oct. 31, 2003

(65) Prior Publication Data

US 2005/0122907 A1 Jun. 9, 2005

(51) Int. Cl.
*G06F 15/16* (2006.01)
*G06F 11/00* (2006.01)
*H04L 12/433* (2006.01)
*H04L 12/24* (2006.01)

(52) U.S. Cl.
CPC .............. *H04L 12/24* (2013.01); *H04L 12/433* (2013.01); *H04L 41/00* (2013.01)
USPC ............................. 709/251; 370/229; 370/235

(58) Field of Classification Search
USPC ............................ 709/251; 370/909, 229, 235
See application file for complete search history.

(56) References Cited

U.S. PATENT DOCUMENTS

| 4,817,082 | A  | * | 3/1989  | Orsic ............................ 370/389 |
| 5,268,896 | A  | * | 12/1993 | Pauwels ........................ 370/413 |
| 6,449,283 | B1 | * | 9/2002  | Chao et al. .................... 370/461 |
| 6,606,300 | B1 | * | 8/2003  | Blanc et al. ................... 370/229 |
| 6,661,336 | B1 | * | 12/2003 | Atkins et al. ................. 340/10.2 |
| 6,842,423 | B1 | * | 1/2005  | Erimli et al. ................. 370/235 |

OTHER PUBLICATIONS

Publication entitled "Arbiters: An Exercise in Specifying and Decomposing Asynchronously Communicating Components", by Jo C. Ebergen, Science of Computer Programming, 1992, pp. 223-245.

* cited by examiner

*Primary Examiner* — Tonia L Dollinger
*Assistant Examiner* — Adam Cooney
(74) *Attorney, Agent, or Firm* — Park, Vaughan, Fleming & Dowler LLP

(57) ABSTRACT

One embodiment of the present invention provides a system that regulates communications between a plurality of transmitters and a receiver. The system comprises a plurality of cells, wherein each cell controls communications from a transmitter in the plurality of transmitters to the receiver. A single token flows through a ring which passes through the plurality of cells, wherein the presence of the token within a cell indicates that the corresponding transmitter may communicate with the receiver.

18 Claims, 5 Drawing Sheets

METHOD AND APPARATUS FOR REGULATING COMMUNICATIONS BETWEEN MULTIPLE TRANSMITTERS AND RECEIVERS

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to communication networks. More specifically, the present invention relates to a method and an apparatus for regulating communications between multiple transmitters and receivers.

2. Related Art

Modern multiprocessor systems typically include multiple computing nodes that communicate with each other through a communication network. In some multiprocessor systems, each one of these multiple nodes can communicate with any other node, but each node can communicate with only one node at any given time. This can potentially cause contention problems because multiple nodes wish to communicate with a common node at the same time, and the common node can communicate with only one node at any given time. Note that this problem exists regardless of the type of communication medium, whether it be optical, electrical, or mechanical.

A number of different systems have been developed to regulate communications between nodes in these multiprocessor systems, and in doing so, to deal with contention problems. Unfortunately, many of these systems have unwanted side-effects. Some are complex and expensive to operate, while others introduce unnecessary delays into the communications process.

Hence, what is needed is a method and an apparatus for regulating traffic between nodes without the problems described above.

SUMMARY

One embodiment of the present invention provides a system that regulates communications between a plurality of transmitters and a receiver. The system comprises a plurality of cells, wherein each cell controls communications from a transmitter in the plurality of transmitters to the receiver. A single token flows through a ring which passes through the plurality of cells, wherein the presence of the token within a cell indicates that the corresponding transmitter may communicate with the receiver.

In a variation on this embodiment, the system also includes a plurality of receivers. Each receiver has its own token ring that controls communications between the plurality of transmitters and that receiver.

In a further variation, the plurality of cells are arranged in a grid wherein a row corresponds to a transmitter and a column corresponds to a receiver, whereby the grid arrangement facilitates a compact planar layout.

In a variation on this embodiment, the communications can include electrical signals, optical signals, or mechanical signals.

In a variation on this embodiment, each cell is configured to receive a request signal from a corresponding transmitter, and in response to the request signal, is configured to issue an acknowledgement signal to the corresponding transmitter which allows the corresponding transmitter to begin transmitting if the cell has the token.

In a variation on this embodiment, the system also includes an initialization mechanism that is configured to initialize the single token in the token ring.

In a variation on this embodiment, the system operates asynchronously.

In a variation on this embodiment, each transmitter includes a reset mechanism that is configured to release the clearance to communicate with the receiver by resetting the request signal.

In a further variation, the system includes an acknowledgement mechanism configured to confirm the release of the clearance by resetting the acknowledgement signal.

In a variation on this embodiment, the system includes a flow control mechanism configured to selectively limit the communications from the transmitter to the receiver at the request of the receiver.

Table 1 illustrates the events of arbiter 200 and their associated meaning in accordance with an embodiment of the present invention.

Table 2 illustrates state transitions of toggle 300 in accordance with an embodiment of the present invention.

Table 3 illustrates values of R and A and their associated meaning for the transmitter in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Controller

Figure 1:
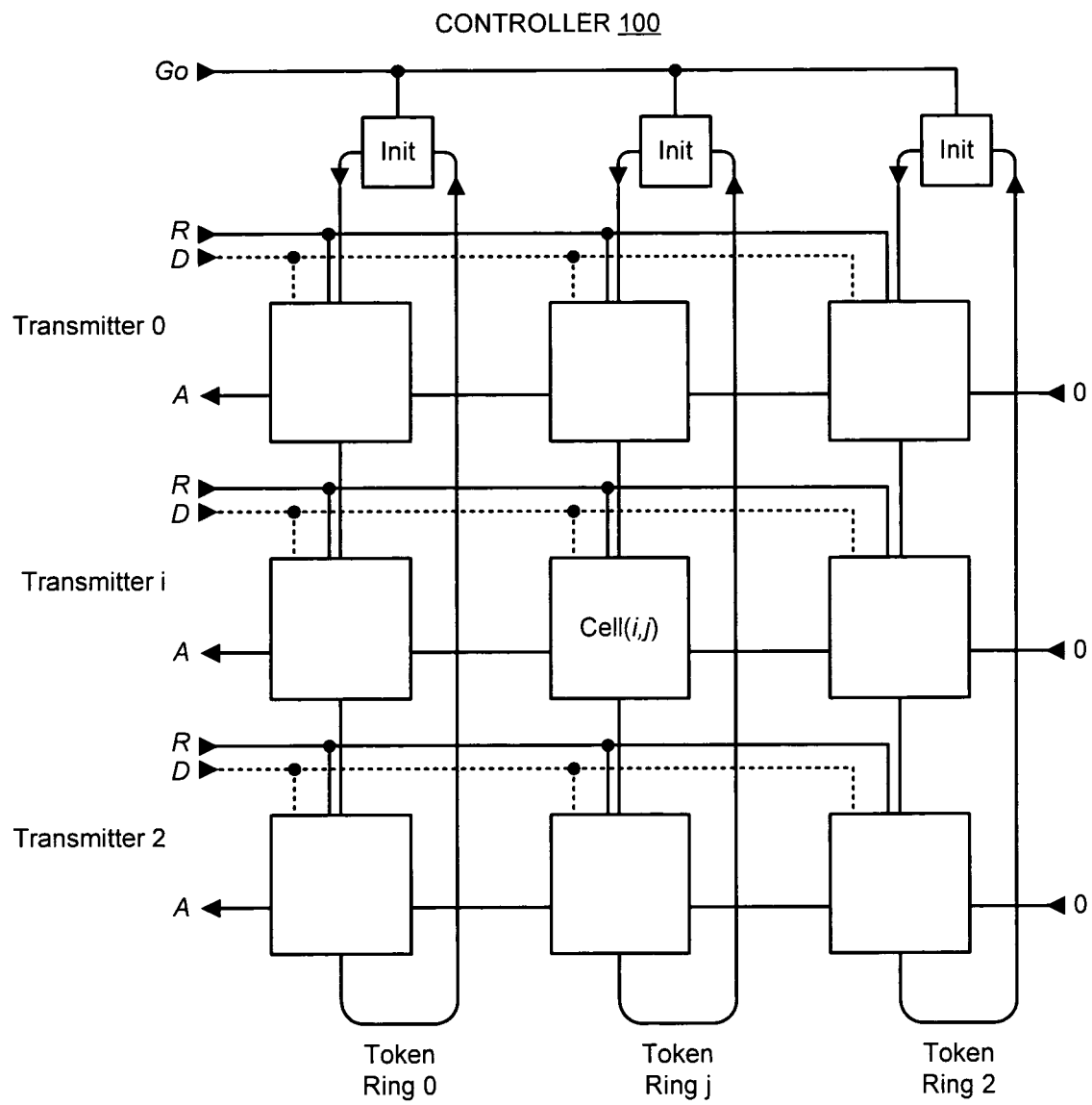
FIG. 1 illustrates a controller in accordance with an embodiment of the present invention.

FIG. 1 illustrates controller 100 in accordance with an embodiment of the present invention. In one embodiment of the present invention, any transmitter may send to any receiver, but only after getting a clearance from controller 100 for that transmission. In order to get the clearance, the transmitter has to specify the address of the receiver and to request the clearance from controller 100. The job of controller 100 is to ensure that for any receiver at any time at most one transmitter has clearance to send to this receiver.

Controller 100 grants clearances to transmitters using N token rings. There is one token ring for each receiver, and each token ring consists of a ring of N cells, one cell for each transmitter. A token circulates from cell to cell in each token ring. Transmitter i requests clearance to send to receiver j by sending a request and destination address j to all cells (i, k) with k=0, ..., N−1. When the token arrives in a cell (i,j) and a request is pending with destination address j, the cell grants the request and transmitter i may transmit to receiver j. Upon completion of a transmission, the token is forwarded to the next cell (i+1,j) in the token ring. When the token arrives in a cell (i,j) and no request is pending, the cell simply forwards the token to the next cell in the token ring. Because there is at most one token in each token ring, at any time at most one transmitter may have the clearance to send to a specific receiver. Furthermore, because the token travels in a ring, controller 100 implements a round-robin scheme among the transmitters for issuing clearances to send to the receiver associated with that token ring.

In one embodiment of the present invention, controller 100 has a connection to all transmitters, but no connection with any receiver. Controller 100 has the following connections, for i=0, 1, ..., (N−1):

From transmitter i to controller 100 Symbol Meaning
D Destination address, 5 bits for N=32 (parallel or serial)
R Request signal, 1 bit
R=1, address D is valid and transmitter requests clearance
R=0, transmitter releases clearance.
From controller 100 to transmitter i Symbol Meaning
A Acknowledgment, 1 bit,
A=1, controller grants to transmitter clearance to send (to receiver with address D)
A=0, controller acknowledges release of clearance.

When transmitter i wishes to send to receiver j, the following sequence of actions occurs:
1. Transmitter i concurrently:
    sets address D to j and then R to 1 to request clearance to send to receiver j; and
    sets its laser to the right frequency, if needed.
2. Transmitter i waits until both of the following occur:
    A=1, i.e., having the clearance to send; and
    its laser is tuned to the right frequency;
    then transmitter i sends its packet to receiver j.
3. Upon completion of the transmission of the packet, transmitter i resets R to 0 and then waits until controller 100 has reset A to 0.

The sequence of actions 1-3 repeats every time transmitter i wishes to send to any receiver. Note that in one embodiment of the present invention, the transmitter adheres to a strict request-acknowledgment protocol: before sending, set the request R and wait until the acknowledgment A is set; after sending, reset request R and wait until the acknowledgment A is reset.

Controller 100 is an N-by-N array of cells with rows that correspond to transmitters and columns that correspond to receivers. Cell (i,j) corresponds to transmitter i and receiver j. All cells in a column are part of a ring-wise connection, called a token ring. FIG. 1 illustrates a controller for N=3.

At any time, and for any receiver, at most one transmitter may have clearance to send to that receiver. The function of controller 100 is to arbitrate among all the transmitters that request clearance to send to the same receiver. For example, transmitter i requests clearance to send to receiver j by first setting the address destination D to j. After the address bits are valid, transmitter i sets the request bit, i.e., R=1. All cells (i, 0 ... N−1) receive this request with D=j, R=1 from transmitter i, but only cell (i,j) will interpret this request as a proper request, since the destination address D equals the hardwired cell index j.

In order to achieve mutual exclusion, each token ring has at most one token. Initially, there is no token in each token ring. Immediately after initialization, the controller launches exactly one token in each token ring by providing one voltage transition on the signal Go. The token then circulates through the token-ring from cell to cell without ever being in more than one cell at a time.

Upon receiving the token, cell (i,j) arbitrates between passing the token to the next cell or holding the token and issuing a clearance to transmitter i. Cell (i,j) can issue a clearance to transmitter i only when both cell (i,j) has a token, the destination address D equals the receiver index j (j=D), and the request bit R is set (R=1). A cell issues a clearance by setting the acknowledgment output (A=1). The acknowledgment then propagates through the row cells to the transmitter. In each row of cells at most one acknowledgment propagates to the transmitter, because at most one cell will initiate the acknowledgment and each transmitter never sends a second request for transmission to any receiver until the transmission for a first request has completed.

When the transmitter completes the transmission to receiver j, the transmitter releases the clearance by resetting the request bit R (R=0). The controller will confirm the release of the clearance by resetting the acknowledgment bit A (A=0). After release of the clearance, cell (i,j) passes the token to the next cell in the token ring. This arrangement implements a round-robin access among the transmitters who wish to send to receiver j.

For this embodiment of the present invention to work, it is important that all messages arrive in order at any receiver. Messages could arrive out of order, for example, when transmitter $T_0$ sends a message over a slow link to receiver R and then transmitter $T_1$ sends a message over a fast link to receiver R, while part of the message from $T_0$ is still in transit. In this case, the beginning of the message from transmitter $T_1$ may arrive before the end of the message from transmitter $T_0$. To avoid this problem, it is important that all signals from one transmitter arrive at a receiver before the first signal of a next transmitter can arrive. In this way, the identity of the transmitter of any signal is always clear. This requirement can be met by ensuring that the maximum difference in total delays over the optical links from any transmitter to any receiver is less than the time the controller takes to switch the clearance-to-send from one transmitter to an other.

Arbiter

Figure 2:
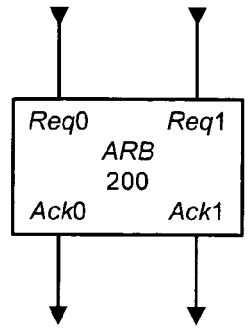
FIG. 2 illustrates an arbiter in accordance with an embodiment of the present invention.

FIG. 2 illustrates arbiter 200 in accordance with an embodiment of the present invention. Arbiter 200 is a primitive element for realizing mutual exclusion between two processes requesting to enter a critical section. In one embodiment of the present invention, a process can be seen as a communication protocol.

The communication behavior of arbiter 200 is a combination of two smaller communication protocols. One communication protocol pertains to terminals Req0 and Ack0 and the other communication protocol pertains to terminals Req1 and Ack1. Each communication protocol has four events reflecting level-based four-phase signaling. The events in each protocol are as follows:

TABLE 1

| Event | Meaning |
| --- | --- |
| Req↑ | Request to enter critical section |
| Ack↑ | Grant to enter critical section |
| Req↓ | Request to release critical section |
| Ack↓ | Confirm release of critical section | where ↑ means a rising transition and ↓ means a falling transition.

The communication protocol for both request-acknowledgment pairs of arbiter 200 is an infinite repetition of request followed by acknowledgment. Each request-acknowledgment pair of arbiter 200 can start in one of two stable initial states, (Req, Ack)=(0, 0) or (Req, Ack)=(1, 1); and at most one pair can start in state (1, 1). When the protocol starts in the initial state (Req, Ack)=(0, 0), the protocol is outside the critical section. The protocol is a repetition of the sequence Req↑→Ack↑→Req↓→Ack↓.

When the protocol starts in the initial state (Req, Ack)=(1, 1), the protocol is inside the critical section. Starting in the latter initial state, the protocol is a repetition of the sequence Req↓→Ack↓→Req↑→Ack↑.

The two protocols for (Req0, Ack0) and for (Req1, Ack1) operate asynchronously and concurrently. A function of arbiter 200 is to ensure that at most one protocol is in its critical section. Protocol (Req0, Ack0) is in its critical section when Ack0=1. Protocol (Req1, Ack1) is in its critical section when Ack1=1. Arbiter 200 ensures that the outputs Ack0 and Ack1 are never both 1. For example, if protocol 1 is in its critical section, i.e. Req1=1 and Ack1=1, and protocol 0 requests access to its critical section by setting Req0 to 1, then arbiter 200 will block a grant to protocol 0 until protocol 1 has released its critical section.

Toggle

Figure 3:
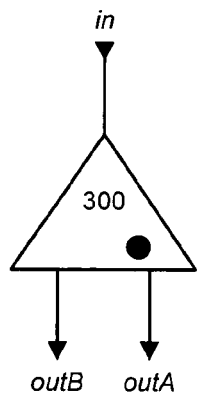
FIG. 3 illustrates a toggle in accordance with an embodiment of the present invention.

FIG. 3 illustrates toggle 300 in accordance with an embodiment of the present invention. Toggle 300 has one input and two outputs, labeled it, outA, and outB. Output outA is marked with a bullet, which indicates the specific initialization in the present embodiment.

In general, the behavior of toggle 300 can be described by the following sequence, which repeats indefinitely:
in ↕ →outA↕ →in↕ →outB↕

Here in↕, outA↕, and outB↕ denote a voltage transition (i.e., a rising or a falling transition). Any voltage transition on the input propagates to a voltage transition on an output, where the transitions occur at alternating outputs. Therefore, all the rising transitions at the input propagate to one output and all falling transitions propagate to the other output.

There are several possible initializations. In one embodiment of the present invention, the following initialization is used for all instances of toggle 300: in=1, outA=1, outB=0. The first transition at the output occurs on the output with the black dot, outA. After the initialization, the following behavior repeats indefinitely:
in↓→outA↓→in↑→outB↑→in↓→outA↑→in↑→outB↓
where ↑ means a rising transition and ↓ means a falling transition.

The following lists all transitions of toggle 300 in sequence:

TABLE 2

| event | in | outA | outB | state |
| --- | --- | --- | --- | --- |
| initial state | 1 | 1 | 0 | stable |
| in↓ | 0 | 1 | 0 | unstable |
| outA↓ | 0 | 0 | 0 | stable |

TABLE 2-continued

| event | in | outA | outB | state |
| --- | --- | --- | --- | --- |
| in↑ | 1 | 0 | 0 | unstable |
| outB↑ | 1 | 0 | 1 | stable |
| in↓ | 0 | 0 | 1 | unstable |
| outA↑ | 0 | 1 | 1 | stable |
| in↑ | 1 | 1 | 1 | unstable |
| outB↓ | 1 | 1 | 0 | stable |

Initialization Module

Figure 4A:
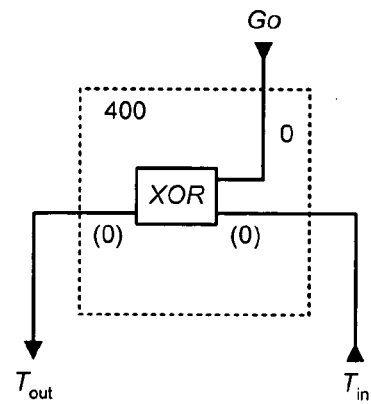
FIG. 4A illustrates an initialization module in accordance with an embodiment of the present invention.
Figure 4B:
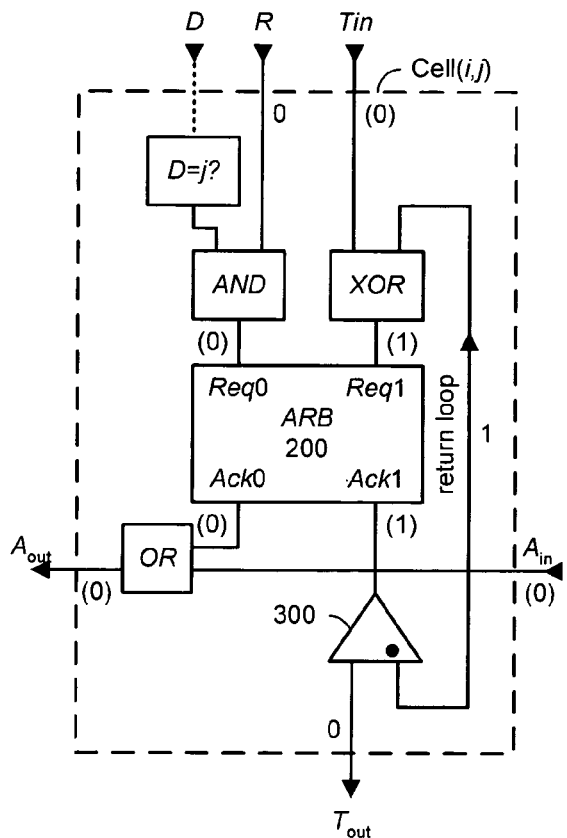
FIG. 4B illustrates a cell in accordance with an embodiment of the present invention.
Figure 4C:
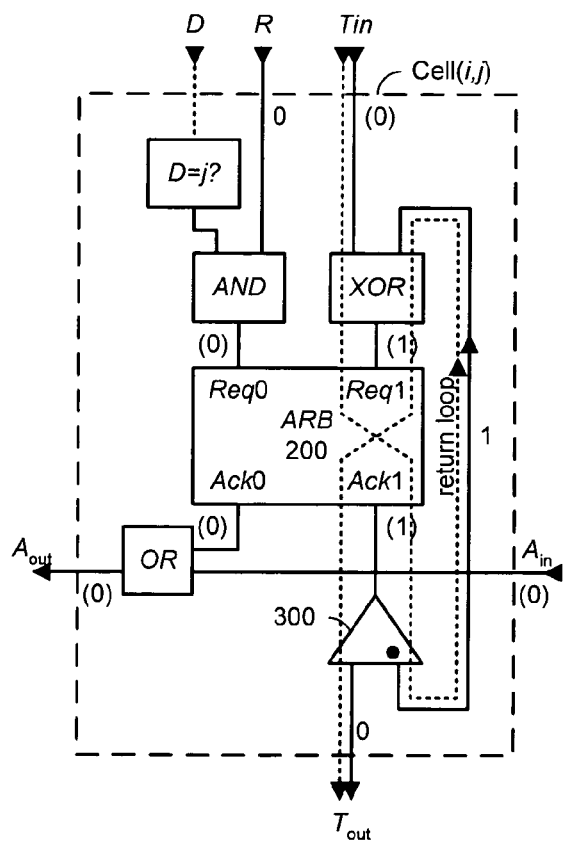
FIG. 4C illustrates the propagation path of a token through a cell in accordance with an embodiment of the present invention.

FIG. 4A illustrates initialization module 400 in accordance with an embodiment of the present invention. After initialization, a token is launched into the token ring by raising the voltage on input Go and then keeping the voltage high. In FIGS. 4A-4C the digit 0 or 1 at a node denotes the initial value to which that particular node must be set. The notation (0) or (1) denotes the value that the node will reach after initialization. Nodes labeled with (0) or (1) need not be set initially.

Cell

FIG. 4B illustrates cell (i,j) in accordance with an embodiment of the present invention. The comparator labeled "D=j?" is a comparator between the destination address D and cell index j, with j hardwired into the comparator. For 32 receivers, D is a five-bit address. The output of the comparator will be 1 when D=j and 0 otherwise.

Initially, arbiter 200 has granted access to the critical section to the (Req1, Ack1) pair. This means that any request from a transmitter will be blocked at arbiter 200 input Req0. We first describe the propagation of the token through the cell (i,j) implementation when there is no request from the transmitter.

FIG. 4C illustrates the propagation path of a token through cell (i,j) in accordance with an embodiment of the present invention. The token arrives at $T_{in}$ by means of a voltage transition. Initially, this is a rising voltage transition. After arrival of the token, the XOR gate lowers input Req1 of arbiter 200, thereby releasing the critical section. Arbiter 200 acknowledges the release of the critical section by lowering Ack1. A falling transition on Ack1 returns back at the input Req1 of arbiter 200 after some delay through toggle 300, the return loop, and the XOR gate. This time the transition on Req1 is a rising transition, meaning a request to access the critical section. If before or during the propagation through the return loop no request from a transmitter has arrived at the input Req0 of arbiter 200, arbiter 200 grants the token request Req1 by raising output Ack1. After a rising transition on Ack1, toggle 300 causes a transition on $T_{out}$, thereby forwarding the token to the next cell in the token ring.

Note that when the token arrives in cell (i,j), arbiter 200 briefly releases the critical section during the time that the token propagates through the return loop. During this brief release arbiter 200 can grant any request of the transmitter. When arbiter 200 grants clearance to a transmitter by setting Ack0 to 1, arbiter 200 blocks further propagation of the token through the cell (i,j) implementation until the transmitter releases the clearance. Upon release of the clearance, arbiter 200 grants the token request, which then causes the token to propagate to the next cell. Also note that the arrival of the token at $T_{in}$ alternatingly represents itself as a rising and a falling transition. Similarly the exit of the token at $T_{out}$ represents itself alternatingly as a rising and a falling transition. A token is inside a cell when the values at $T_{in}$ and $T_{out}$ differ.

Timing Diagram

Figure 5:
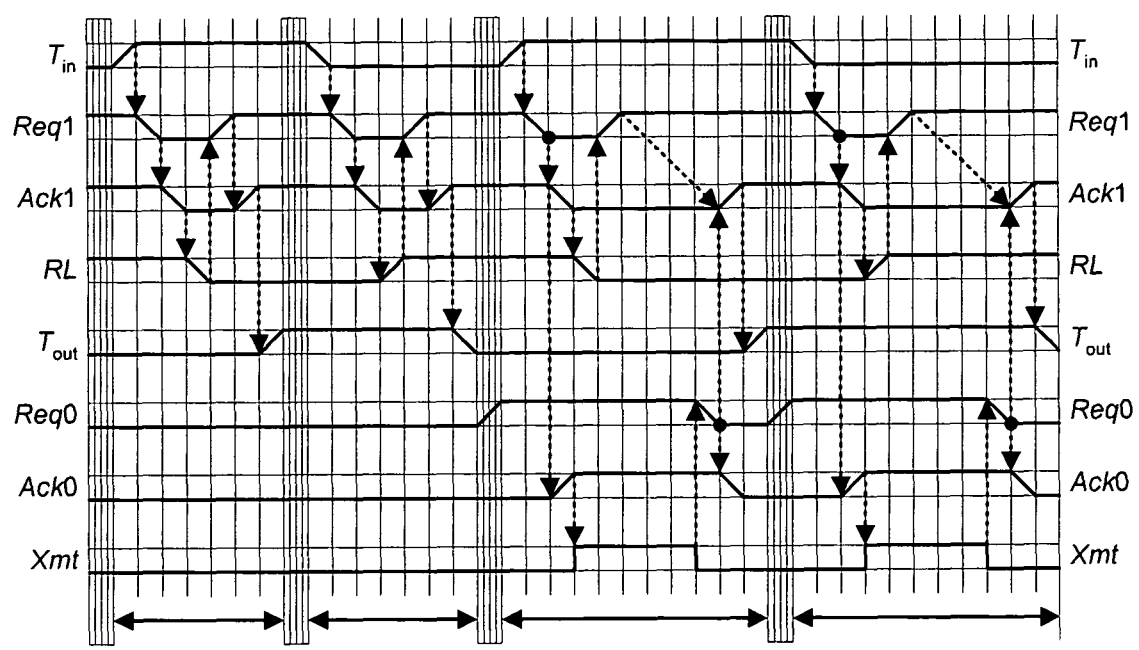
FIG. 5 presents a timing diagram in accordance with an embodiment of the present invention.

FIG. 5 presents a timing diagram in accordance with an embodiment of the present invention. The four rectangles filled with dense vertical lines can be periods of arbitrary length. RL denotes the value of the signal in the return loop, and Xmt indicates when the transmitter has clearance to send to a receiver.

Flow Control

Figure 6:
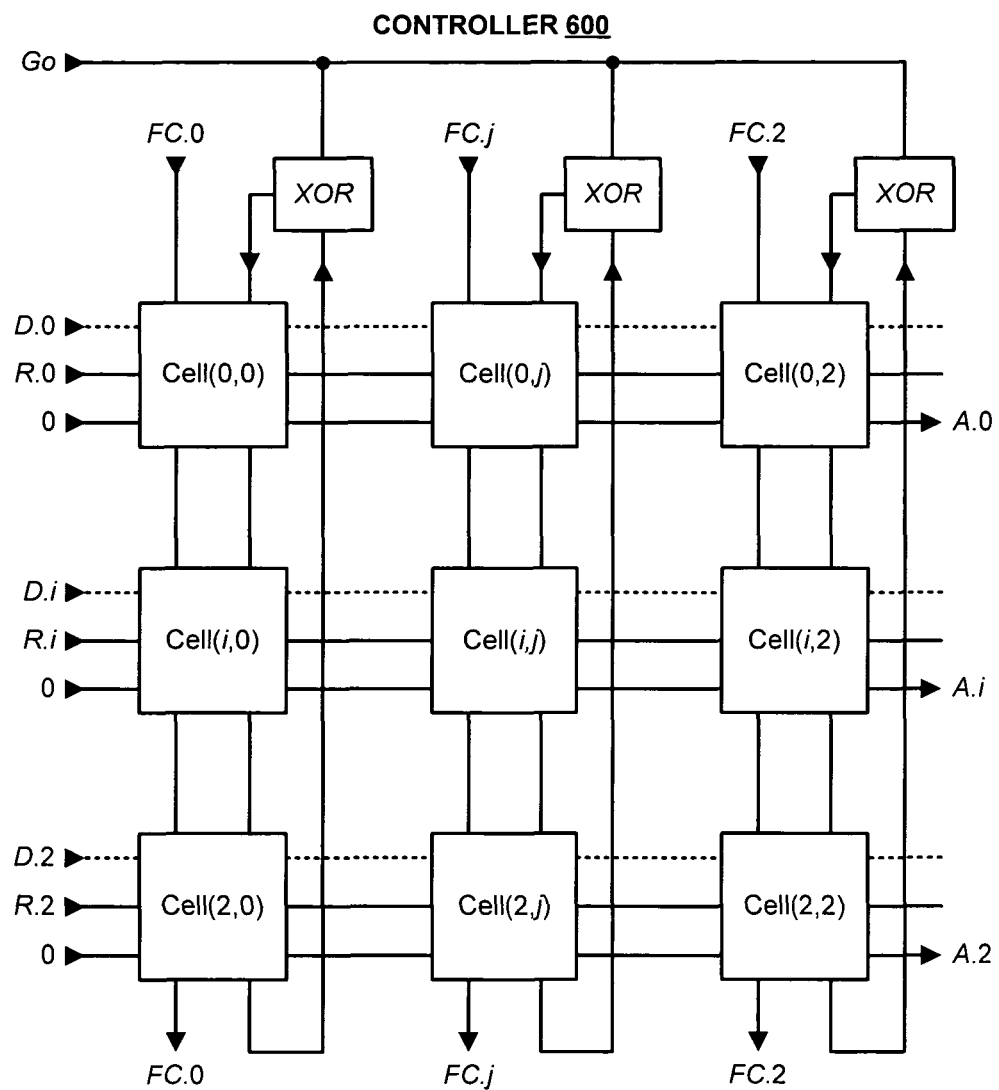
FIG. 6 illustrates a controller with flow control in accordance with an embodiment of the present invention.

FIG. 6 illustrates controller 600 with flow control in accordance with an embodiment of the present invention. Often receivers have a limited buffer capacity, and in order to prevent buffer overflow the system needs a flow control mechanism. In one embodiment of the present invention, the system achieves flow control by using a 1-bit channel, called FC, from each receiver via controller 600 to the transmitter. The channel uses Xon/Xoff signaling, which means that the receiver can signal that it is ready to receive data by setting FC to 1 (Xon) and the receiver can signal that it will soon be unready to receive any data by resetting FC to 0 (Xoff).

It is up to the receiver when to issue Xon and Xoff. The transmitter must pause the transmission soon after the Xoff is received, or risk data loss. The decision when to issue Xon or Xoff depends on the latency from the time the receiver sends the flow control command until the command is in effect (i.e., start or stop of the data flow) at the receiver.

The receiver can make the Xon/Xoff decision based on high-water and low-water marks in its buffers. The purpose of the high-water-mark is correctness by preventing data loss, whereas the purpose of the low-water-mark is efficiency by preventing starvation of the receiver.

Upon adding flow control to the system, controller 600 now has two tasks. The first job of controller 600 is to allow the switching of data from any transmitter to any receiver as illustrated in FIG. 1. The second job of controller 600 is to facilitate the signaling of flow control from any receiver to its current transmitter, where flow-control information travels in the opposite direction. In particular, when controller 600 receives an Xon or Xoff signal from a receiver, controller 600 must relay that Xon/Xoff signal to the transmitter that is then sending data to the receiver.

Figure 7:
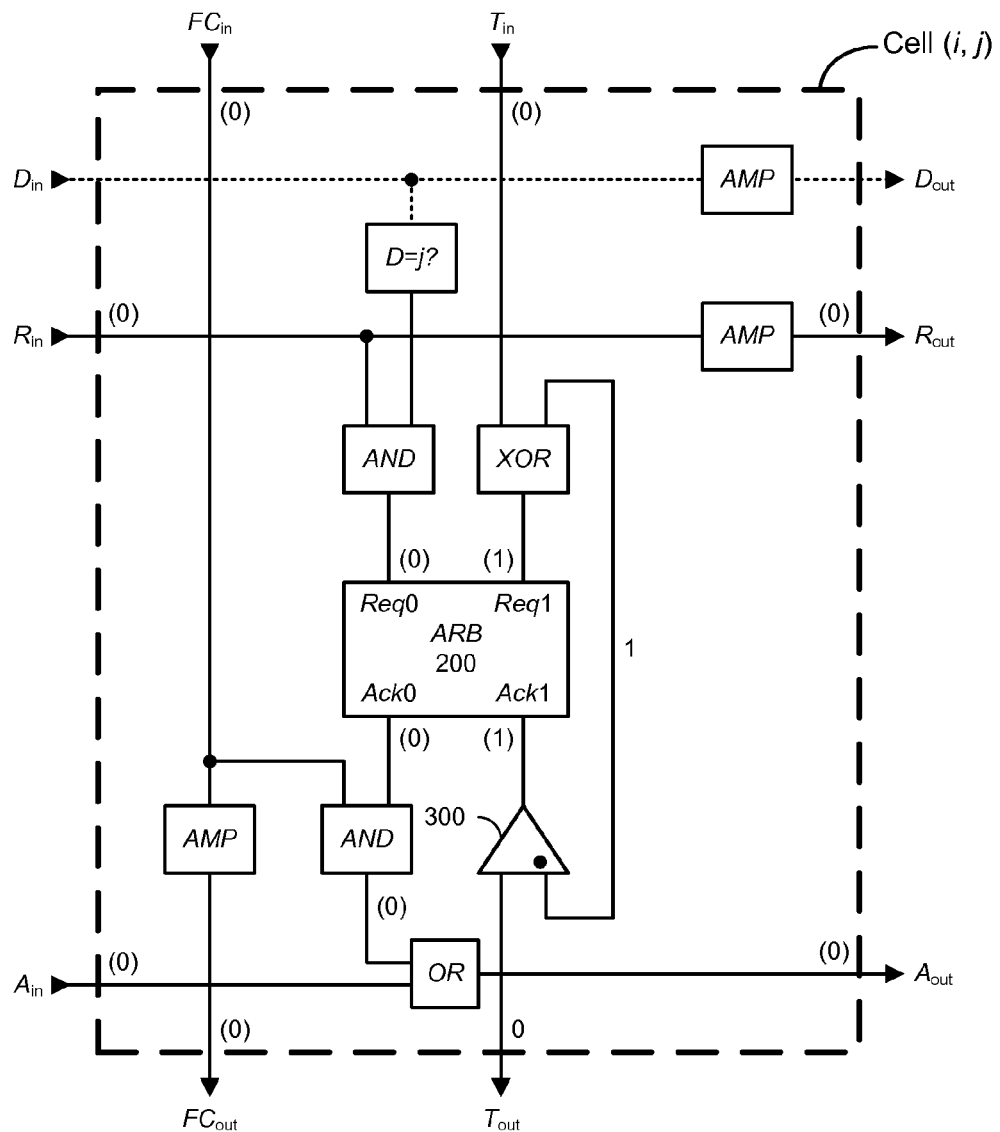
FIG. 7 illustrates a cell with flow control in accordance with an embodiment of the present invention.

FIG. 7 illustrates cell (i,j) with flow control in accordance with an embodiment of the present invention. Boxes labeled "AMP" denote amplifiers. Receiver j issues a 1-bit signal called FC.j that propagates along the column of token-ring cells associated with receiver j. FC.j=1 means receiver j is ready to receive data; FC.j=0 means that receiver j will soon be unready to receive data.

Transmitter i receives a 1-bit signal called A.i that propagates along the row of token-ring cells associated with transmitter i. A.i=1 means that transmitter i has clearance to send data and the receiver is ready to receive data; A.i=0 means that transmitter i has no clearance to send or the receiver is soon unready to receive data. Hence, A=1 for a transmitter means that it can transmit, and A=0 means that it must wait with transmitting. Each A.i signal starts with the value 0 at the edge, and is OR-ed in each cell along the row. At most one cell can set A.i to 1 and reset it to 0.

The following are the combinations of values for R and A for each transmitter and their meaning:

TABLE 3

| R | A | Transmitter should: |
|---|---|---|
| 0 | 0 | not transmit, may change D, then set R = 1 |
| 1 | 0 | not transmit, may not change D, may reset R = 0 when done transmitting |
| 1 | 1 | transmit, may not change D, may reset R = 0 when done transmitting |
| 0 | 1 | not transmit, may change D, but not set R |

Because controller 600 knows which transmitter has clearance to send to the receiver, controller 600 can use this knowledge to relay the Xon/Xoff to the proper transmitter. Implementing the addition of the flow-control signaling to an implementation of controller 600 is straightforward. For example, controller 600 can define a new "clearance-to-send" signal for a transmitter as the logical AND of the old "clearance-to-send" signal for the transmitter and the flow-control signal of the receiver to which the transmitter wishes to send.

There can be one small problem with this embodiment. At about the same time that a transmitter sends the end of a message to a receiver, the receiver may set its flow control to 0. Subsequently, the transmitter releases the token in the token-ring and an arbiter in a following token-ring cell may set Ack0 to 1. The rising edge of Ack0 may occur at about the same time that the input $FC_{in}$ is reset to 0. As a result, at about the same time the inputs of the AND gate may change in opposite directions, which may create a small pulse on the output of the AND gate. To avoid any problems with short pulses, the transmitter can include circuitry to deal with such short pulses.

Controller 600 receives requests from any transmitter and issues clearances to send as soon as possible. During transmissions, controller 600 forwards flow-control information from receiver to the appropriate transmitter. Under heavy load, the scheme to assign clearances becomes a simple round-robin allocation. Controller 600 maintains a fair queue, where any transmitter can get clearance to send to a receiver for a second time only after every other transmitter has had the opportunity to receive a clearance to send to the same receiver. The controller can also handle Xon/Xoff flow control.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A system for regulating communications between a plurality of transmitters and a receiver, comprising:

a plurality of cells, wherein each cell controls communications from a transmitter in the plurality of transmitters to the receiver;

wherein the plurality of cells are arranged in a token ring that regulates communications from the plurality of transmitters to the receiver;

wherein the presence of a token within a token ring cell indicates that the corresponding transmitter may communicate with the receiver; and wherein each cell is configured to receive a request signal from a corresponding transmitter, and in response to the request signal, is configured to issue an acknowledgement signal to the corresponding transmitter which allows the corresponding transmitter to begin transmitting if the cell has the token;

a flow control mechanism in each cell that receives a flow-control signal from the receiver, wherein the receiver asserts the flow-control signal when the receiver is ready to receive communications, and wherein a logical conjunction operation is performed on the flow-control signal and an old acknowledgement signal to generate a new acknowledgement signal, wherein the old acknowledgement signal is asserted when the cell has the token and a transmitter corresponding to the cell has requested transmission to the receiver, wherein a logical disjunction operation is performed on the new acknowledgment signal and a first acknowledgement signal from a first neighboring cell to generate a second acknowledgement signal that propagates to a second neighboring cell along a row of cells.

2. The system of claim 1, further comprising:
a plurality of receivers; and
a plurality of token rings, wherein each token ring passes a corresponding token among token ring cells that control communications from the plurality of transmitters to a receiver corresponding to the token ring.

3. The system of claim 2, wherein the plurality of cells are arranged in a grid wherein a row corresponds to a transmitter and a column corresponds to a receiver.

4. The system of claim 1, wherein the communications can include one of:
an electrical signal;
a mechanical signal; and
an optical signal.

5. The system of claim 1, wherein each transmitter further comprises a reset mechanism that is configured to release the clearance to communicate with the receiver by resetting the request signal.

6. The system of claim 5, wherein the system further comprises an acknowledgement mechanism configured to confirm the release of the clearance by resetting the acknowledgement signal.

7. The system of claim 1, further comprising an initialization mechanism configured to initialize the single token in the token ring.

8. The system of claim 1, wherein the system operates asynchronously.

9. A method for regulating communications between a plurality of transmitters and a receiver, comprising:
receiving a request signal from a transmitter at a cell in a plurality of cells requesting to communicate with the receiver;
wherein the plurality of cells are arranged in a token ring that regulates communications from the plurality of transmitters to the receiver;
in response to the request signal, issuing an acknowledgement signal to the transmitter which allows the transmitter to begin transmitting if the presence of a token is detected within the cell, wherein the acknowledgement signal is not issued unless the receiver has asserted an enabling signal to the cell that indicates that the receiver is ready to receive data and a flow-control signal has been asserted by the receiver, and wherein a logical conjunction operation is performed on the flow-control signal and an old acknowledgement signal to generate the acknowledgement signal, wherein the old acknowledgement signal is asserted when the cell has the token and a transmitter corresponding to the cell has requested transmission to the receiver, wherein a logical disjunction operation is performed on the acknowledgment signal and a first acknowledgement signal from a first neighboring cell to generate a second acknowledgement signal that propagates to a second neighboring cell along a row of cells; and
in the transmitter, handling erroneous short pulses in a corresponding acknowledgement signal, wherein the short pulses occur as a result of the flow-control signal from the receiver being deasserted after the acknowledgement signal is asserted.

10. The method of claim 9, wherein the plurality of cells include a plurality of token rings, wherein each token ring passes a corresponding token among token ring cells that control communications from the plurality of transmitters to a receiver corresponding to the token ring.

11. The method of claim 9, wherein a plurality of cells that regulate communications between the transmitters and receivers are arranged in a grid wherein a row corresponds to a transmitter and a column corresponds to a receiver.

12. The method of claim 9, wherein the communications can include one of:
an electrical signal;
a mechanical signal; and
an optical signal.

13. The method of claim 9, further comprising revoking the permission for the transmitter to communicate with the receiver when the transmitter resets the request signal.

14. The method of claim 13, further comprising resetting the acknowledgement signal to confirm the revocation of the permission for the transmitter to communicate with the receiver.

15. The method of claim 9, further comprising initializing the token in the token ring.

16. The method of claim 9, wherein the system operates asynchronously.

17. A multi-processor system, comprising:
a plurality of processors;
a plurality of transmitters associated with the processors;
a plurality of receivers associated with the plurality of processors;
a plurality of cells, wherein each cell controls communications from a transmitter in the plurality of transmitters to a receiver;
wherein the plurality of cells are arranged in a token ring that regulates communications from the plurality of transmitters to a receiver;
wherein the presence of a token within a token ring cell indicates that the corresponding transmitter may communicate with the receiver; and
wherein each cell is configured to receive a request signal from a corresponding transmitter, and in response to the request signal, is configured to issue an acknowledgement signal to the corresponding transmitter which allows the corresponding transmitter to begin transmitting if the cell has the token;
a flow control mechanism in each cell that receives a flow-control signal from the receiver, wherein the receiver asserts the flow-control signal when the receiver is ready to receive communications, and wherein a logical conjunction operation is performed on the flow-control signal and an old acknowledgement signal to generate a new acknowledgement signal, wherein the old acknowledgement signal is asserted when the cell has the token and a transmitter corresponding to the cell has requested transmission to the receiver, wherein a logical disjunction operation is performed on the new acknowledgment signal and a first acknowledgement signal from a first neighboring cell to generate a second acknowledgement signal that propagates to a second neighboring cell along a row of cells.

18. The system of claim 1, further comprising circuitry in the transmitters to handle erroneous short pulses in a corresponding acknowledgement signal, wherein the short pulses occur as a result of the flow-control signal from the receiver being deasserted after the acknowledgement signal is asserted.

* * * * *

UNITED STATES PATENT AND TRADEMARK OFFICE
CERTIFICATE OF CORRECTION

| | |
|---|---|
| PATENT NO. | : 8,930,582 B2 |
| APPLICATION NO. | : 10/699412 |
| DATED | : January 6, 2015 |
| INVENTOR(S) | : Josephus C. Ebergen et al. |

It is certified that error appears in the above-identified patent and that said Letters Patent is hereby corrected as shown below:

In the specification

At column 3, line 46, delete the term "if needed." and replace it with the term -- if and only if (iff) needed. --

At column 3, line 63, delete the word "receivers." and replace it with the term -- receiver j. --

At column 4, line 53, delete the words "an other." and replace them with the word -- another. --

At column 5, line 42, please place a "." at the end of the equation so it appears as: -- outB↕. --

Signed and Sealed this
Nineteenth Day of April, 2016

Michelle K. Lee
*Director of the United States Patent and Trademark Office*